(12) United States Patent
Kadantseva et al.

(10) Patent No.: US 9,582,070 B2
(45) Date of Patent: Feb. 28, 2017

(54) DETECTING USER INPUT PROVIDED TO A PROJECTED USER INTERFACE

(71) Applicant: Seiko Epson Corporation, Tokyo (JP)

(72) Inventors: Tatiana Pavlovna Kadantseva, Vancouver (CA); Ricardo Te Lim, Richmond (CA); Raymond Chow, Richmond (CA); George Lyons, Langley (CA); Manfred Wittmeir, Aichach (DE)

(73) Assignee: Seiko Epson Corporation, Tokyo (JP)

( * ) Notice: Subject to any disclaimer, the term of this patent is extended or adjusted under 35 U.S.C. 154(b) by 462 days.

(21) Appl. No.: 14/087,479

(22) Filed: Nov. 22, 2013

(65) Prior Publication Data

US 2014/0078052 A1 Mar. 20, 2014

Related U.S. Application Data

(63) Continuation of application No. 13/018,549, filed on Feb. 1, 2011, now abandoned.
(Continued)

(51) Int. Cl.
*G06F 3/042* (2006.01)
*G06F 3/00* (2006.01)
(Continued)

(52) U.S. Cl.
CPC ............... *G06F 3/005* (2013.01); *A47J 27/00* (2013.01); *A47J 36/32* (2013.01); *G06F 3/042* (2013.01); *H05B 1/0263* (2013.01)

(58) Field of Classification Search
CPC ............................. G06F 3/0428; G06F 3/042
(Continued)

(56) References Cited

U.S. PATENT DOCUMENTS 5,661,667 A 8/1997 Rueb et al.
6,140,617 A 10/2000 Berkcan et al.
(Continued)

FOREIGN PATENT DOCUMENTS

JP WO 2009031633 A1 * 3/2009 ............ G03B 21/00
WO 2009031633 A1 3/2009

OTHER PUBLICATIONS

Joe Marshall et al. Pressing the Flesh: Sensing Multiple Touch and finger pressure on arbitrary surfaces, 2008.*
(Continued)

*Primary Examiner* — Tung Vo
*Assistant Examiner* — Rowina Cattungal

(57) ABSTRACT

Apparatuses and methods are provided for determining whether a user intends to provide an input using an image of a control appearing on a surface. An apparatus may include first and second cameras to capture set and second sets of two or more images of the surface, and a unit to determine whether various conditions are true. A first condition is that a particular number of skin-color pixels are present within one cell of the two or more images. A cell location substantially coincides with the image of the control. A second condition is that the skin-color pixels persist for at least a particular time period. A third condition is that a region of skin-color pixels has a substantially rectangular shape. A fourth condition is that corresponding edges of skin-color pixels in the first and second sets of images are within a predefined offset distance. Additional conditions are disclosed.

13 Claims, 9 Drawing Sheets

Related U.S. Application Data

(60) Provisional application No. 61/325,088, filed on Apr. 16, 2010.

(51) Int. Cl.
*A47J 27/00* (2006.01)
*A47J 36/32* (2006.01)
*H05B 1/02* (2006.01)

(58) Field of Classification Search
USPC .......................................................... 345/156
See application file for complete search history.

(56) References Cited

U.S. PATENT DOCUMENTS

| | | |
|---|---|---|
| 6,492,627 B1 | 12/2002 | Ensinger et al. |
| 6,578,569 B2 | 6/2003 | Liese |
| 7,148,913 B1 | 12/2006 | Keaton et al. |
| 7,308,112 B2 | 12/2007 | Fujimura et al. |
| 7,519,210 B2 | 4/2009 | Hirsch et al. |
| 7,599,561 B2 | 10/2009 | Wilson et al. |
| 8,355,545 B2 | 1/2013 | Corcoran et al. |
| 2002/0078942 A1 | 6/2002 | Hershey et al. |
| 2007/0154095 A1* | 7/2007 | Cao .................. G06K 9/00234 382/190 |
| 2008/0273755 A1* | 11/2008 | Hildreth .............. G06F 1/1626 382/103 |
| 2009/0153494 A1 | 6/2009 | Laundroche et al. |
| 2009/0300531 A1 | 12/2009 | Pryor |
| 2010/0027853 A1* | 2/2010 | Wen .................. G06K 9/00362 382/118 |
| 2010/0194713 A1* | 8/2010 | Kawashima .......... G06F 3/042 345/175 |
| 2010/0231522 A1 | 9/2010 | Li |
| 2011/0187678 A1* | 8/2011 | Salaverry ............. G06F 3/0428 345/175 |

OTHER PUBLICATIONS

Pressing the Flesh: Sensing Multiple Touch and Finger Pressure on Arbitrary Surfaces, Joe Marshall, Tony Pridmore, Mike Pound, Steve Benford, and Boriana Koleva, Mixed Reality Lab, University of Nottingham, UK, J. Indulska et al. (Eds.): Pervasive 2008, LNCS 5013, (pp. 38-55).

* cited by examiner

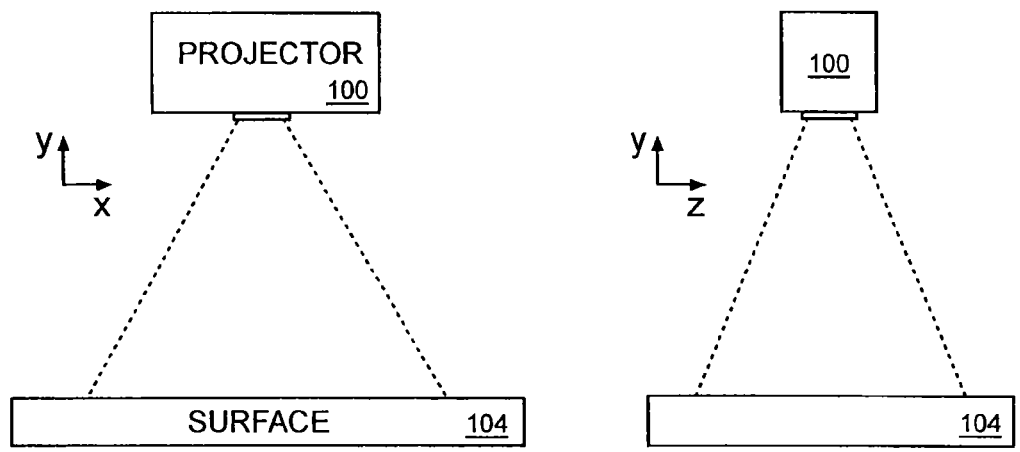
FIG. 1A          FIG. 1B
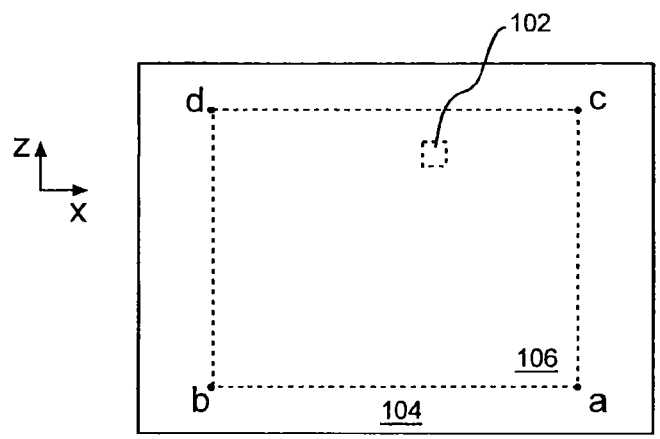
FIG. 2

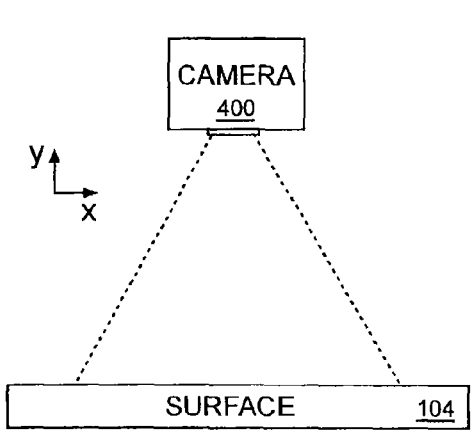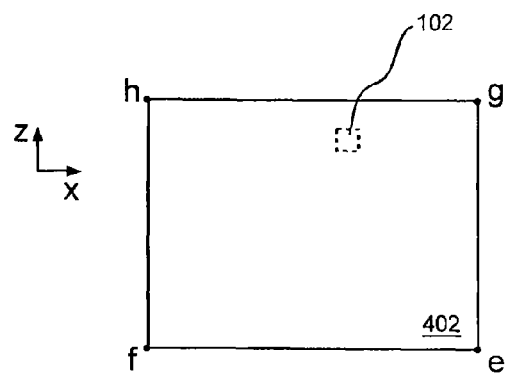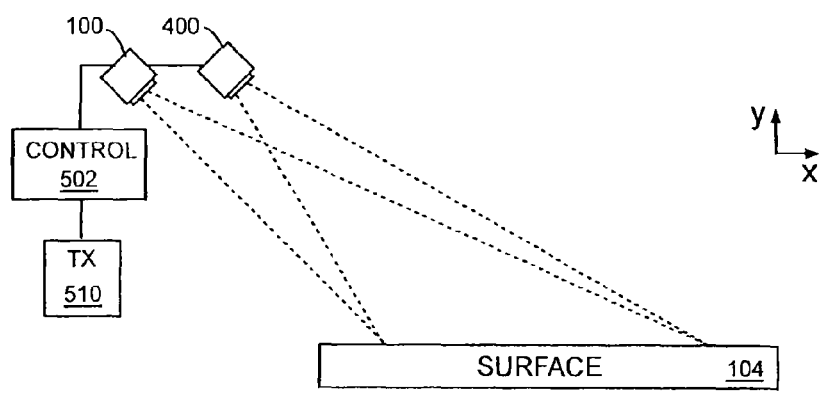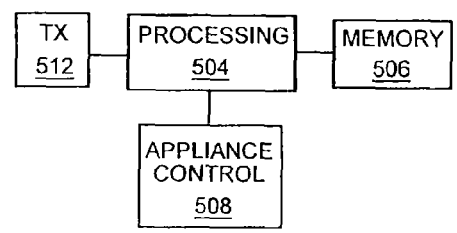
FIG. 4A
FIG. 4B
FIG. 5

DETECTING USER INPUT PROVIDED TO A PROJECTED USER INTERFACE

CROSS REFERENCE TO RELATED APPLICATIONS

This application is a continuation of application Ser. No. 13/018,549, filed Feb. 1, 2011, which claims the benefit under 35 USC Section 119(e) of U.S. provisional patent application Ser. No. 61/325,088, filed Apr. 16, 2010. Each of the above-identified applications is incorporated by reference in its entirety.

FIELD

This application relates generally to detecting whether a user intends to provide an input to a system and in particular to detecting a user's intent to provide input to an image of a control.

BACKGROUND

The appearance of electro-mechanical and other types of switches, button, knobs, and controls tends to degrade with repeated use. In addition, the appearance of physical switches and controls is generally fixed so that modifying the language or an iconic image on a physical switch or control requires replacement of the control. Moreover, it is sometimes desired to hide controls when they are not needed. Generally, this is not possible with physical controls without introducing additional structure, such as a movable panel.

Physical switches, button, knobs, and controls are useful for detecting whether a user intends to provide an input to a system. There are problems with known techniques for detecting whether a user intends to provide an input where a physical control is not present. One problem is that known techniques are expensive. There is also a problem of "false positives." A technique may infer that some activity indicates that a user intends to provide an input, but the activity may also sometimes be consistent with a lack of user intent to provide input. When the technique detects the activity and infers intent to provide input, but the user, in fact, does not intend to provide input, the technique provides a false positive. The problem of false positives tends to become more common when known techniques are employed in an inexpensive fashion. However, low cost is important. Accordingly, there is a need for low-cost, robust methods and apparatus for detecting user input provided to a projected user interface.

SUMMARY

One aspect is directed to an apparatus for determining whether a user intends to provide an input using an image of a control appearing on a surface. The apparatus may include a first camera to capture a fires set of two or more images of the surface and a unit. The unit may determine whether first, second, and third conditions are true. The first condition being that a particular number of pixels classified as skin color are present within one cell of the first set of two or more images, the cell having a location substantially coinciding with the image of the control. The second condition being that the pixels classified as skin color persist for at least a particular time period. The third condition being that the pixels classified as skin color have a first shape. The unit may provide a signal indicative of an intent of a user to provide an input if the each of the first, second, and third conditions are true. In a preferred embodiment, the first shape is substantially rectangular. Additionally, determination of the third condition may include bisecting the one cell of the first set of two or more images into a first region including all pixels classified as finger-nail color and a second region excluding all pixels classified as finger-nail color, determining a first width span, i.e. W1, of pixels classified as skin color along a side of the second region that abuts the first region, and determining a second width span, i.e. W2, of pixels classified as skin color along a second side of the second region opposite the first side. The third condition is determined to be true if the absolute value of the difference of W1 and W2 is less than a predefined margin value.

In one embodiment, the apparatus may include a second camera to capture a second set of two or more images of the surface, the second camera being spaced apart from the first camera. The unit may determine whether a fourth condition is true, the fourth condition being that the pixels classified as skin color and having the first shape are within a first distance from the surface. The unit may provide a signal indicative of an intent of a user to provide an input if the each of the first, second, third and fourth conditions are true. In this embodiment, the second set of two or more images include a second cell having a location substantially coinciding with the image of the control. A first edge of pixels classified as skin color within said first cell is determined, and a second edge of pixels classified as skin color within said second cell is also determined. The second edge of pixels corresponds to the first edge of pixels. In this case, the fourth condition is determined to be true if a displacement distance between the corresponding the first edge of pixels and second edge of pixels is not greater than a predefined offset distance.

Embodiments are also directed to methods for determining whether a user intends to provide an input using an image of a control appearing on a surface.

BRIEF DESCRIPTION OF THE DRAWINGS

FIGS. 1A and 1B illustrate front and side views of a projector and a surface according to an embodiment.

FIG. 2 illustrates a plan view of the surface of FIGS. 1A and 1B.

FIG. 4A is a front side view of a camera and a surface according to an embodiment. FIG. 4B shows an exemplary frame captured by the camera.

FIG. 5 is a front view of a projector, a camera, and a surface according to an embodiment.

DETAILED DESCRIPTION

Figure 3A:
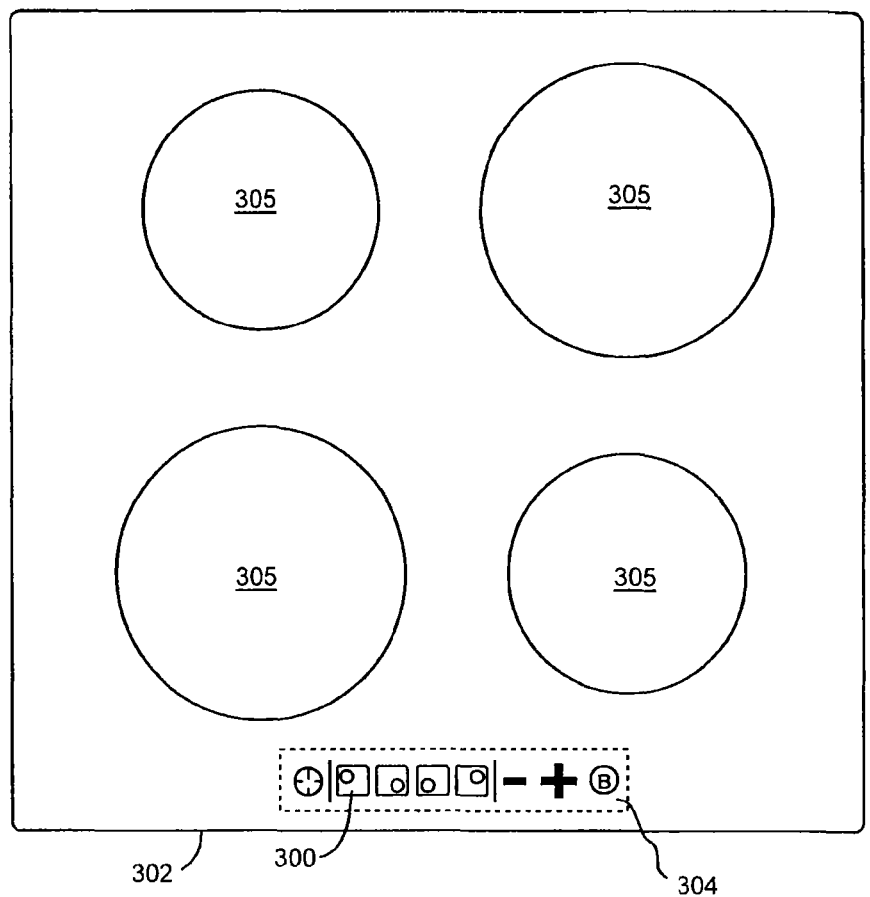
FIGS. 3A and 3B illustrate projected controls.

While embodiments may be described generally below, it will be appreciated that the principles and concepts described in this specification may be implemented in a wide variety of contexts, including controls for games, computers, kiosk, vending or other types of machines found in a home, office, or factory. In particular, principles and concepts described in this specification are applicable to home appliances, such as those found in the kitchen or laundry, and to entertainment devices found in the home, such as games and audio/video entertainment.

FIGS. 1A and 1B illustrate front and side views, respectively, of an embodiment in which a projector 100 projects a visible image onto a planar surface 104. FIG. 2 illustrates a plan view of the planar surface 104. The projected image includes a control 102 ("projected control"). The projected control 102 may be projected anywhere within a projection area 106 and may be projected so as to appear at a known location within the projection area. The projection area 106 may be rectangular, but this is not critical as other shapes may be used. In addition, the projector 100 may project two or more projected controls 102. The surface 104 may be made from any desired material and may be any desired color. The surface 104 may be a horizontal surface, such as countertop. In one embodiment, a horizontal surface 104 may be a table for playing games, such as card games. The surface 104 may also be a vertical surface, such as a wall or a side of an appliance. In one embodiment, a vertical surface 104 may be a side of a kiosk or vending machine. As additional examples, the surface 104 may be a cooktop or a side of a refrigerator. In one embodiment, the surface 104 may lie in a plane that is neither horizontal nor vertical. For example, the surface 104 may lie in a plane that makes an 80 degree angle with the horizontal. In one embodiment, the surface 104 may be non-planar. For example, the surface 104 may be concave or convex, or the projection area 106 part of the surface 104 may be, wholly or partially, concave or convex.

The projector 100 and surface 104 may be installed at particular locations so that the projector and surface are in a fixed spatial relationship with one another. The projection area 106 may have fixed dimensions and may appear at a fixed location on the surface 104. As one example, the projection area 106 may be 40×30 cm. In addition, the digital image that is input to the projector 100 and used by the projector to create a projected image may have fixed horizontal and vertical dimensions. As one example, the input image may be 800×600 pixels, and points "a" and "d" in FIG. 2 may correspond with pixel coordinates (0, 0) and (800, 600), respectively, of the input image. The input image may be mapped to the projection area 106. For example, 16 pixels of input image may be mapped to 1 cm of the projection area 106 on the surface 104. For every pixel of the input image, there is a coordinate location in the projection area 106 on the surface 104. In addition, the coordinate location of each pixel corresponds with a horizontal and vertical distance from a corner point such as point "a." Accordingly, the projected control 102 may be projected to appear at a particular coordinate location in projection area 106 on the surface 104. The coordinate location of each pixel thus corresponds with a physical location and is a known distance from one of the corner points: a, b, c, and d, each of which is projected onto known locations on the surface 104.

Figure 3B:
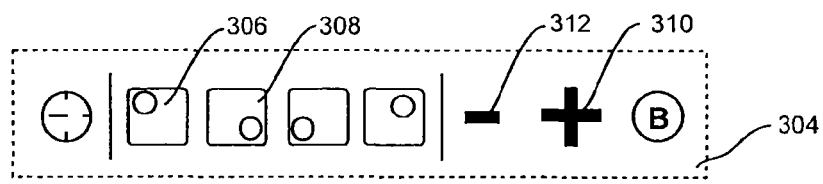
Figure 3C:
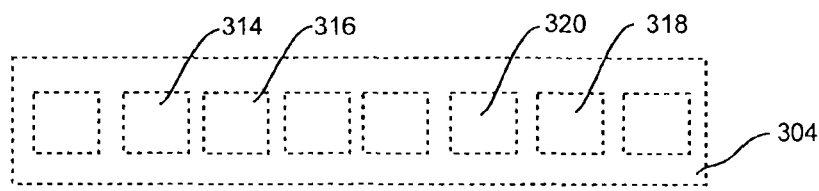
FIG. 3C illustrates cells corresponding with the projected controls according to one embodiment.

As one example of a projected control and projection area, FIG. 3A shows a plurality of projected controls 300 projected onto projection area 304 of a cooktop surface 302 according to one embodiment. An image of a projected control may be any type of image and any desired size. For example, a projected control may be a button or a sliding switch. FIG. 3B shows exemplary projected controls 306, 308, 310, and 312 in projection area 304 for selecting a heating element 305, for increasing, and for decreasing the temperature of a selected element. Each control 306, 308, 310, and 312 is displayed within a cell. FIG. 3C shows cells 314, 316, 318, and 320 that correspond with the projected controls 306, 308, 310, and 312, respectively. The cells are not displayed on the cooktop; FIG. 3C merely shows the locations of the cells. In one embodiment, each cell is 60×60 pixels and corresponds with a 30×30 mm region of the surface 104, which is approximately 3/2 the width of an exemplary human finger. Each cell corresponds with a particular location on the surface 302.

Turning now to FIG. 4A, a visible light camera 400 may capture images of the projection area 106 on the surface 104. The visible light camera 400 may capture digital images at a frame rate of 30 fps, but this is not critical as other frame rates may be used. The camera 400 may include a CCD or CMOS image sensor having an array of sensor pixels. The camera 400 and surface 104 may be installed at particular locations so that the camera and surface are in a fixed spatial relationship with one another. FIG. 4B shows an exemplary frame 402 captured by camera 400. The digital image 402 may have fixed dimensions. For example, the frame 402 may be 800×600 pixels. Like the input image, pixels of images 402 captured by the camera 400 may be mapped to physical locations in the projection area 106. For example, points "e" and "h" of the frame 402 may be mapped to points "a" and "d" of projected area 106 (FIG. 2). The camera 400 may capture projected controls 102 that are projected onto the projection area 106 by projector 100. Accordingly, the spatial locations of projected controls 102 on a projection surface may be determined from the control's pixel coordinates in captured frame 402. In addition, the camera 400 may capture any physical objects within the projection area 106. For example, a human user's hand or finger situated between the surface 104 and camera 400 may be captured by the camera 400. The spatial locations of physical objects situated between the surface 104 and camera 400 may also be determined from object's pixel coordinates in captured frame 402.

FIG. 5 shows one example of the projector 100 and camera 400 positioned to one side of the surface 104. As this example shows, it is not essential that the projector 100 be positioned so that the projector is centered with respect to the surface 104. In addition, it is not essential that the camera 400 be positioned so that the camera is centered with respect to the surface 104. In alternative embodiments, the projector 100 may be positioned to one side of the surface 104. Further, in alternative embodiments, the camera 400 may be positioned to one side of the surface 104. The projector 100 and the camera 400 may be positioned on any side of the surface 104, e.g., front, back, left, or right sides. In addition, it is not critical that the projector 100 and camera 400 be positioned so that they are close to or adjacent one another.

For example, the projector 100 may be positioned to one side and the camera 400 may be positioned to a different side of the projection area.

Still referring to FIG. 5, a unit 502 may be coupled (wired or wirelessly) with the projector 100 and camera 400 according to one embodiment. The control unit 502 may provide images to the projector 100 and receive frames 402 from the camera 400. The control unit 502 may include a memory. The control unit 502 may perform operations for determining whether a user intends to provide input using a projected control. The control unit 502 may generate a signal indicative of whether a user intends to provide input using a projected control. The control unit 502 may execute instructions stored in a memory. The control unit 502 may be a CPU, a digital signal processor (DSP), or another type of processor, or a state machine. The control unit 502 may be formed on an integrated circuit (IC).

FIG. 5 also shows a processing unit 504, which may be coupled with a memory 506 and an appliance control unit 508. The processing unit 504 may execute instructions stored in a memory. The processing unit 504 may issue commands to the appliance control unit 508. The processing unit 504 may be a CPU, a digital signal processor (DSP), or another type of processor, or a state machine. The processing unit 504 may be formed on an IC. Instructions or software executed by the processing unit 504 may enable it to perform known processing and communication operations. In addition, in one embodiment, the instructions or software enable the processing unit 504 to perform operations for determining whether a user intends to provide input using a projected control. The appliance control unit 508 may be unit of an appliance may control the operation of an appliance.

In one embodiment, the control unit 502 provides a signal to the processing unit 504 indicative of a user's intent to provide input using a projected control. The control unit 502 and processing unit 504 may be coupled with one another via wireless transceivers 510, 512. Alternatively, the units 502, 504 may be coupled by any other desired means, e.g., wire or optical fiber. The processing unit 504 may cause an action in an appliance in response to receipt of a signal indicative of a user's intent to provide input using a projected control.

Projecting an image onto a surface at an angle results in distortion of the image's dimensions known as a "keystone effect." In embodiments where the projector 100 is positioned to one side of the surface 104, the projected image may be warped prior to projection in order to prevent or minimize keystone distortion. In addition, capturing an image from a planar surface at an angle results in distortion of the image's dimensions similar to the "keystone effect." The captured image may be inverse-warped to prevent or minimize inverse-keystone distortion prior to determining the physical locations of objects in the captured image.

Figure 6A:
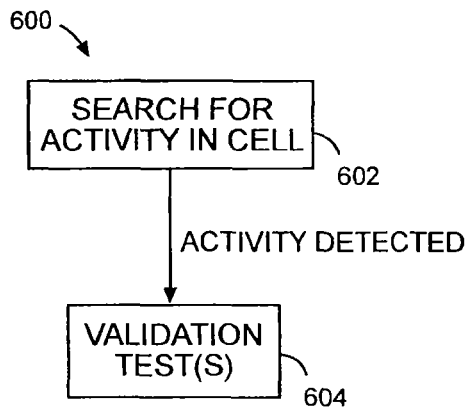
FIGS. 6A and 6B show flowcharts of methods for determining whether a user intends to provide input using a projected control according to embodiments.

FIG. 6A shows a flowchart of a method 600 for determining whether a user intends to provide input using a projected control, e.g., to activate or deactivate the control. In operation 602, one cell corresponding with a physical location of a projected control is repeatedly searched at periodic intervals. Searching may involve continuously scanning the pixels of a cell at periodic intervals, e.g., as each frame or two or more frames are captured. If activity is detected within the cell, it may be tentatively concluded that the user intends to provide input using a projected control. The conclusion may be treated as tentative because the activity may also be consistent with a lack of user intent to provide input. In other words, the activity may be a "false positive." If activity is detected within a cell, the method proceeds to operation 604 in which one or more validation tests may be conducted to determine whether the tentative conclusion should be treated as true. If activity is not detected within a cell, the searching of the cell at periodic intervals may continue.

Figure 6B:
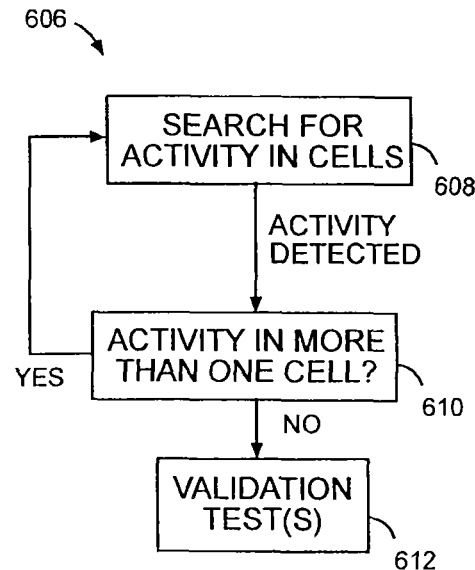

FIG. 6B shows a flowchart of an alternative method 606. In operation 608, two or more cells of a frame are repeatedly searched for activity at periodic intervals. If activity is detected within one cell, the method proceeds to operation 610 where it is determined if activity is also detected in another of the two or more cells. If activity is also detected in another cell, the method returns to operation 608. The detection of activity in more than one cell may be inconsistent with an intent to select a single projected control. For example, a user's finger may be in motion, passing over a control within the sample time period. If activity is not detected in another cell, the method proceeds to operation 612 where one or more validation tests are performed to determine whether the tentative conclusion that the user intends to provide input using a projected control should be treated as true. Otherwise, searching of the two or more cells continues at periodic intervals.

A search for activity, e.g., operations 602 and 608, may include examining each pixel within a cell and classifying pixels as either skin-colored pixels and non-skin-colored pixels. In one embodiment, pixels of frame 402 are in an RGB color space and a pixel may be classified according to the following known test. Specifically, a pixel may be classified as skin-colored if the following conditions are true:

(1) R>95, G>40, B>20, and
(2) (max{R, G, B}−min{R, G, B})>15, and
(3) |R−G|>15, and
(4) R>G, R>B; or
(1) R>220, G>210, B>170, and
(2) |R−G|≤15, and
(3) R>B, G>B.

Pixels not satisfying the above conditions are classified as non-skin colored. The pixel classifying test may classify a region of the finger occupied by a finger nail as non-skin-colored, however, this is not essential. In alternative embodiments, alternative tests for classifying pixels into skin-colored and non-skin-colored pixels may be used. Alternative tests may operate on pixels in color spaces other than RGB, e.g., YUV. As each pixel within a cell is examined, a count of skin-colored pixels may be generated. If the number of pixels within a cell that are classified as skin-colored exceeds a particular threshold, then it may be tentatively concluded that the user's finger is within the boundaries of the cell and the user intends to provide input using the projected control. As one example of a threshold, the threshold may be 2400 pixels for a 60×60 pixel cell. In one alternative, a search for activity, e.g., operations 602 and 608, may include any known edge detection method. If one or more edges between a non-skin colored region and a skin colored region are detected within a cell, it may be tentatively concluded that the user's finger is within the boundaries of the cell.

Figure 7:
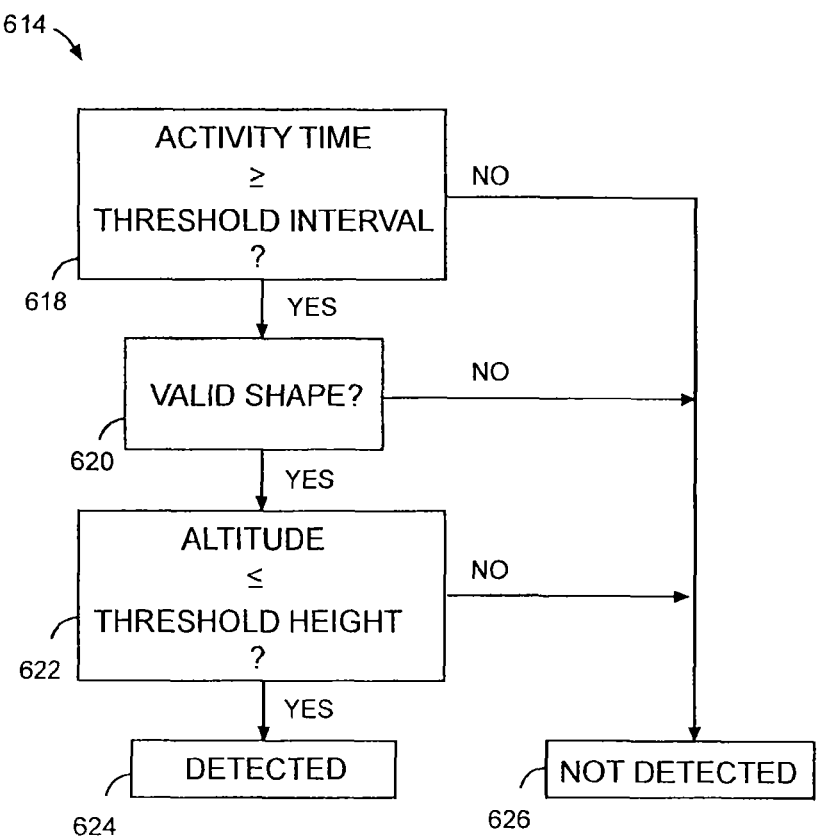
FIG. 7 is flow chart of an embodiment of a method for performing validation tests according to an embodiment.

FIG. 7 is flow chart of an embodiment of a method 614 for performing validation tests. The method 614 may include a valid time operation 618, a valid shape operation 620, and a valid height operation 622. In one embodiment, if all of the operations return a valid or confirming result, the tentatively conclusion that the user's finger is within the boundaries of the cell and the user intends to provide input using the projected control is confirmed (operation 624). On the other hand, if any of the operations do not return a valid result, the tentative conclusion is not confirmed (operation 626). In one embodiment, either operation 604 or 612 may include the method 614. Alternatively, either operation 604 and 612 may include any one or more of the individual validation operations 618, 620, and 622.

The valid time operation 618 determines if activity is present for a time period exceeding a threshold time interval. For example, if a sufficient number of skin-color pixels are present for a time period of 0.5 second or longer, then the operation returns a confirming result. On the other hand, if a sufficient number of skin-color pixels are present but for less than the time threshold, then the operation returns an invalid result and it may be concluded that activity is not present.

Figure 8:
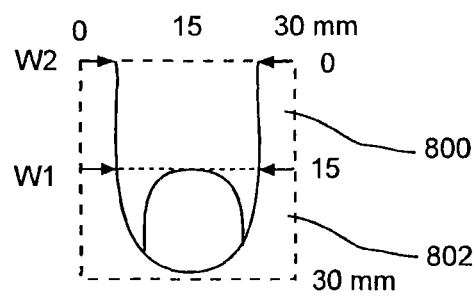
FIG. 8 depicts a finger overlaying an exemplary cell.

The valid shape operation 620 may include determining if the shape of the skin-colored pixel region matches a valid shape. If the detected shape matches a valid shape, then the operation returns a confirming result. On the other hand, if the detected shape fails to match a valid shape, then the operation returns an invalid result and it may be concluded that activity is not present. FIG. 8 illustrates a finger overlaying an exemplary 30×30 mm cell. For purposes of valid shape operation 620 the cell may be subdivided into two regions 800, 802. Any known edge-detection algorithm may be employed to determine edges of the skin-colored region. Two side edges of a finger may be determined, however, this is not critical. In one embodiment, one side or front edge may be determined. After edge determination, first and second widths W1 and W2 of the skin-colored region are determined. A valid shape may be rectangular and it may be concluded that the skin-colored region has a rectangular shape if W1 equals W2. It is not critical that W1=W2, and in one embodiment a confirming result may be returned if the absolute value of the difference between W1 and W2 is less than a particular margin (abs{W2−W1}<margin), e.g., 2.5 mm. In addition to rectangular, a valid shape may be any other desired shape, e.g., polygonal or elliptical.

Figure 9:
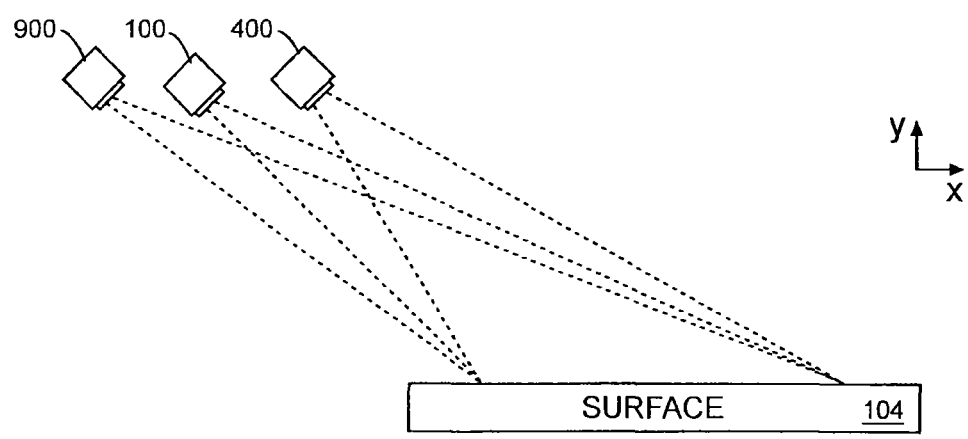
FIG. 9 is a front view of a projector, first and second cameras, and a surface according to an embodiment.
Figure 10:
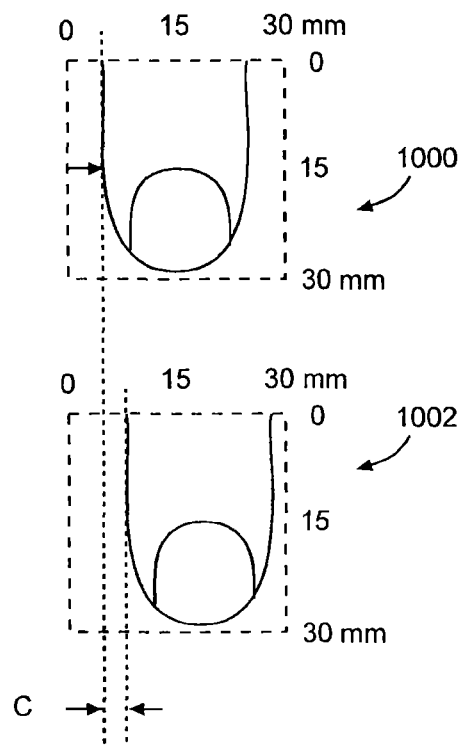
FIG. 10 depicts captured images of a finger overlaying an exemplary cell.

Referring again to FIG. 7, the valid height operation 622 determines if the height of the skin-colored pixel region is less than a threshold height. If the detected height is less than the threshold height, then the operation returns a confirming result. On the other hand, if the detected height is greater than the threshold height, then the operation returns an invalid result and it may be concluded that activity is not present. FIG. 9 illustrates an embodiment for determining if the detected height is less than a threshold height. In the shown embodiment, the projector 100 and the camera 400 are positioned to one side of the surface 104. In addition, a second camera 900 is positioned to the same side of the surface 104. Each camera obtains frames that include an image of the cell, e.g., the camera 400 may capture a cell image 1000 and the camera 900 may capture a cell image 1002, as shown in FIG. 10. Any known edge-detection algorithm may be employed to determine one or more edges for each of the skin-colored regions of the images 1000 and 1002. The valid height operation 622 may include determining a distance "C" between comparable edges of the images 1000, 1002. If the distance C is less than or equal to a particular offset distance, then the detected height is less than the threshold height and the operation 622 may return a confirming result. A low or zero detected height is consistent with a user's finger touching a surface displaying a projected control. The touching of a control, in turn, is consistent with a user intent to provide an input via the projected control. On the other hand, if the distance C is greater than the offset distance, then the detected height is greater than the threshold height. A detected height above a threshold height is consistent with a user's finger hovering above the surface displaying the projected control, which is inconsistent with a user intent to provide an input via the projected control. The particular threshold height may be determined empirically. The particular offset distance C may be determined from geometry.

Figure 11:
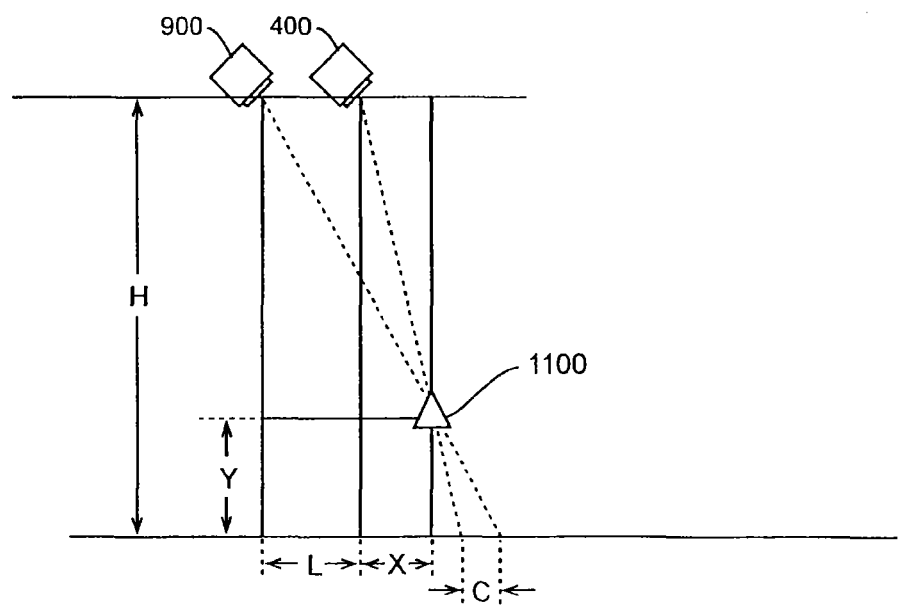
FIG. 11 illustrates first and second cameras, and a surface according to an embodiment.

FIG. 11 illustrates how elevation of an object captured by two cameras may be determined from the offset distance C according to the following expression:

$$Y = \frac{C \times H}{L + C} \quad (1)$$

The elevation of object 1100 above a projection surface 104 is "Y" and the elevation of the cameras 400 and 900 is "H." The distance between the cameras 108 and 110 is "L." While FIG. 10 shows both cameras 400 and 900 to one side of the object 148, expression (1) may also be used where cameras 400 and 900 are on opposite sides of the object 1100.

To summarize, FIGS. 6A and 6B show exemplary methods 600 and 606 for determining whether a user intends to provide input using a projected control. FIG. 7 shows an exemplary method 614 for validating a determination that a user intends to provide input using a projected control. In one embodiment, if each of the valid time operation 618, valid shape operation 620, and valid height operation 622 return a result confirming the determination of one of the methods 600, 606 that a user intends to provide input using a projected control, then it is determined that a user input is detected (operation 624). On the other hand, if any of the operations 618, 620, and 622 do not confirm the determination of method 600 or 606, the it is determined that a user input is not detected (operation 626). These operations may be performed, in whole or part, by control unit 502, processing unit 504, or any other suitable unit.

Figure 12:
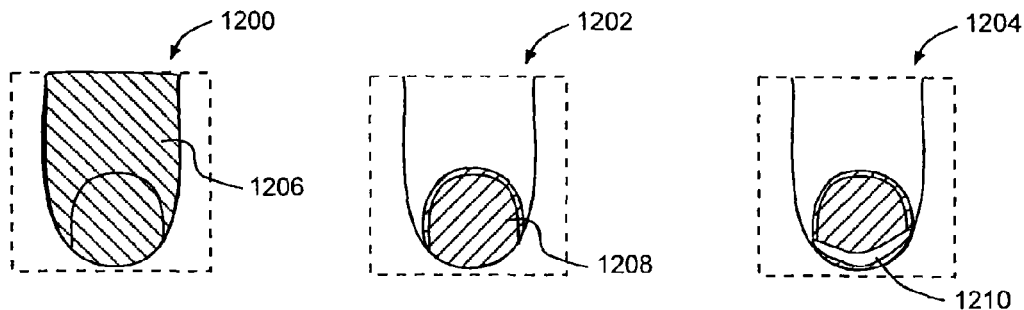
FIG. 12 depicts captured images of a finger overlaying an exemplary cell.
Figure 13:
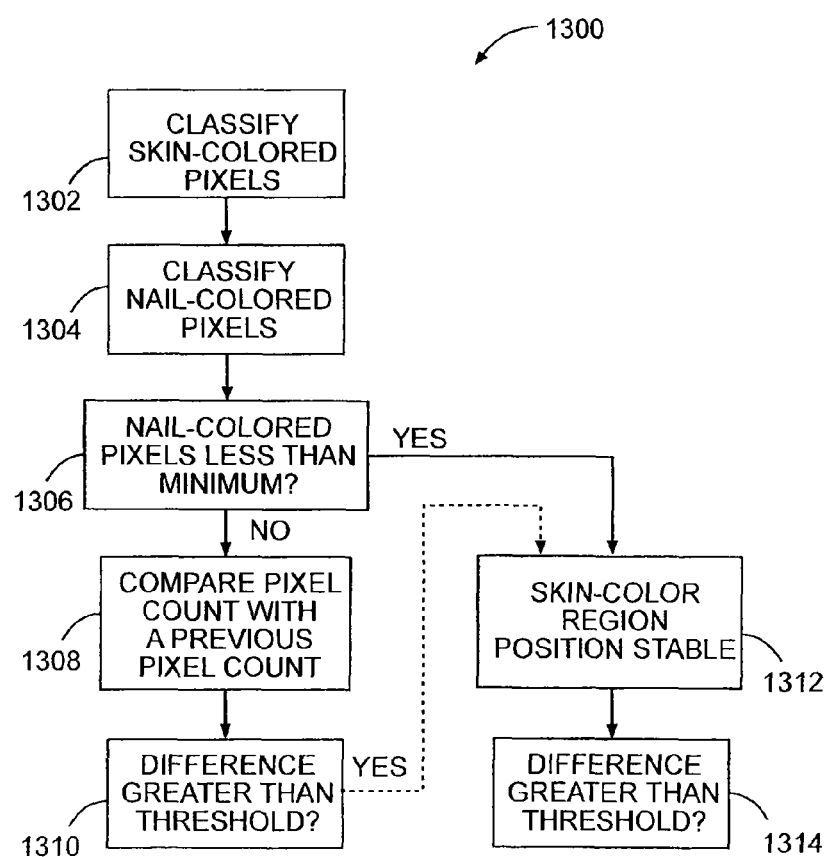
FIG. 13 is a flowchart of a method according to an embodiment.

Referring now to FIGS. 12 and 13, an alternative embodiment for performing validation tests is shown. FIG. 12 shows images 1200, 1202, and 1204 of a particular cell captured by a camera, e.g., the camera 400. In the images, a human finger is situated between the surface 104 and camera 400. FIG. 13 illustrates operations in a method 1300 for determining whether a tentative conclusion that the user's finger is within the boundaries of the cell and that the user intends to provide input using the projected control should be confirmed. In one embodiment, either operation 604 or 612 may include the method 1300. In addition, either operation 604 and 612 may include the method 1300 separately or in addition to any one or more of the individual validation operations 618, 620, and 622.

The operation 1302 may include examining each pixel within a cell and classifying each pixel as either a skin-colored pixel or a non-skin-colored pixel. In one embodiment, pixels of frame 402 may be received from camera 102 in a YUV color space or the received frame may be converted to a YUV color space, and a pixel may be classified as skin-colored according to the following test: If
102<U<128,
102<V<128,
115<U+128<145,
150<V+128<170, and
100<Y<200,
the pixel may be considered skin color. The area 1206 of image 1200 shows an area where pixels may be classified as skin-colored pixels. The operation 1302 is not limited to the skin-color test set forth above. In other embodiments, any suitable alternative skin-color test may be used.

The operation 1304 may include examining each pixel within a cell and classifying each pixel as either a finger-nail-colored pixel or a non-finger-nail-colored pixel. In one embodiment, pixels of frame 402 may be classified according to the following known test: If
102<U<128,
102<V<128,
105<U+128<145,
158<V+128<170,
100<Y<200,
pixel is nail color. The area 1208 of image 1202 shows an area where pixels may be classified as finger-nail-colored pixels. The operation 1304 is not limited to the nail-color test set forth above. In other embodiments, any suitable alternative nail-color test may be used. One advantage of using a nail-color test is that the variation in color of fingernails among humans of various races is believed to be smaller than the variation in color of skin.

The operation 1306 may include comparing the number of nail-colored pixels with a minimum threshold. This is operation is useful for detecting situations where a condition is present that may interfere with a test described below. For example, if the user is wearing nail polish, the counted number of nail-colored pixels is not likely to satisfy the minimum threshold. The wearing of nail polish may interfere with a test described below.

The operation 1308 may include comparing a count of the number of nail-colored pixels for a current frame with a corresponding count from a previous frame. The previous frame may be any frame within a particular preceding time period, e.g., ½ second. The count of fingernail colored pixels may change as a result of the finger being pressed against the surface 104. As shown in image 1204, an area 1210 of the fingernail turns white when the finger is pressed against the surface 104 due to blood being forced out of part of the tissue under and adjacent to the fingernail. While the area 1210 may take a variety of shapes and sizes depending on the particular user, the area 1210 will be captured by the camera 400 as an area of generally white pixels not satisfying either of the classification tests for skin-colored or finger-nail-colored pixels. Accordingly, when the finger is pressed against the surface 104, the count of finger-nail-colored pixels will be lower than at times when the finger is not pressed against the surface, e.g., the count of finger-nail-colored pixels in image 1202 will be greater than the count of finger-nail-colored pixels in image 1204. The operation 1310 may include determining whether a difference between a count of a current frame and a previous frame is greater than a threshold. As one example, a pixel difference threshold may be 30 pixels. In one alternative embodiment, the operation 1308 may determine if the number of white pixels in the fingernail region or in the cell exceeds a threshold. The presence of white pixels being due, as mentioned, to a portion of the fingernail turning white when the finger is pressed against a surface.

Figure 14:
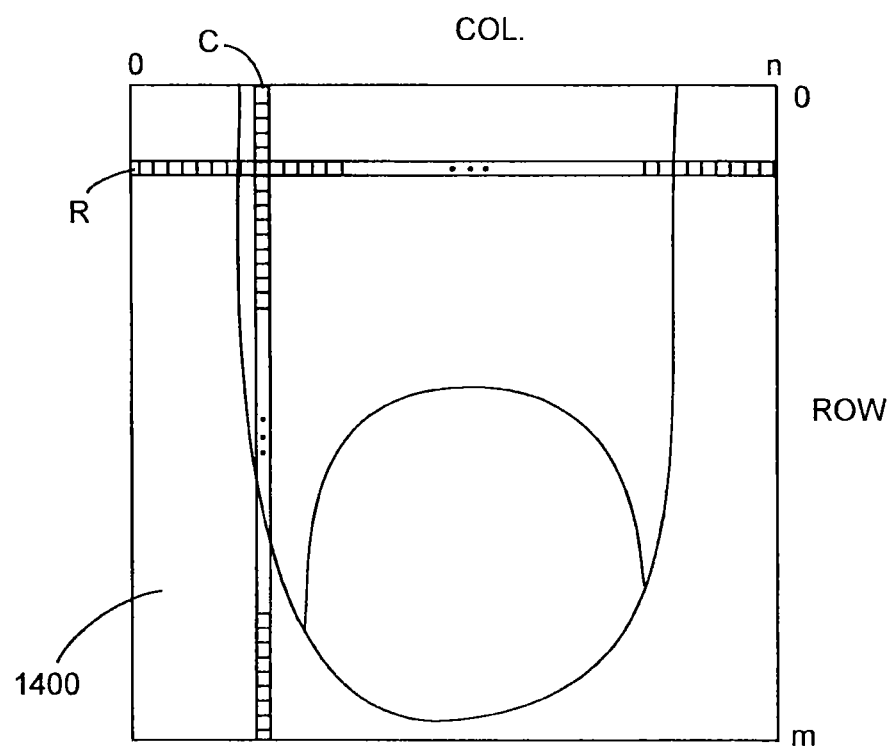
FIG. 14 depicts a finger overlaying an exemplary region of interest according to an embodiment.

A user may wear fingernail polish, which may interfere with the classification of particular pixels as nail colored and the comparing of counts of nail-colored pixels. Generally speaking, the hands and fingers of all users have some degree of tremor, tremble, or involuntary shaking movement, i.e., a user's outstretched hand will generally have at least some tremble, the degree of tremble depending on the particular individual. However, when the hand or finger is placed against an object, the tremor or tremble generally stops. The operations 1312 and 1314 may be employed where it is difficult or impossible to compare of counts of nail-colored pixels. The operation 1312 evaluates a region of interest 1400 comprised of a matrix of skin-colored and non-skin-colored pixels. FIG. 14 illustrates an exemplary region of interest. FIG. 14 also illustrates one exemplary row "R" of pixel locations and one exemplary column "C" of pixel locations of the matrix. In one embodiment, the Y value of non-skin-colored pixels may be set to zero. The operation 1312 may scan and calculate a row sum for each row R of the region of interest. If the Y value for a pixel location is greater than a minimum value, e.g., 50, the column number of the location is added to the row sum. For example, if only the pixels in cells 10, 11, 12, 13, 14 and 15 of a particular row have Y values greater than 50, then the sum for the row is 75. As a second example, if only the pixels in cells 9, 10, 11, 12, 13, and 14 of a particular row have Y values greater than 50, then the sum for the row is 69. Thus, a lateral movement of the area of skin-colored pixels results in a change in a row sum. The change in row sum is proportional to the amount of movement. Further, the operation 1312 may calculate a sum of the row sums ("grand total–row"). In addition, to calculating row sums, the operation 1312 may scan and calculate a column sum for each column C of the region of interest. The column sum may be calculated in a manner analogous to the method for calculating row sums. Further, the operation 1312 may include calculating a sum of the column sums ("grand total–column") Additionally, the operation 1312 may determine a position metric for a frame by adding the grand total–row and the grand total–column sums. Further, the operation 1312 may include comparing a position metric for a first frame with a second frame. Equal-valued position metrics evidence lack of movement, while a difference between the position metrics of first and second frames indicates movement of an area of skin-colored pixels. A lack of movement of an area of skin-colored pixels within the region of interest is consistent with a user's finger contacting the projection surface. A user's finger in contact with the projection surface is consistent with a user intent to provide an input via the projected control. Conversely, movement of an area of skin-colored pixels within the region of interest is consistent with a user's finger being in a position above the projection surface. A user's finger not contacting the projection surface is not consistent with a user intent to provide an input via the projected control. The operation 1312 may include calculating a difference between the position metrics of first and second frames, and determining whether the position difference is greater than a threshold positional difference amount.

In one embodiment, the operations 1312 and 1314 may be performed in addition to operations 1308 and 1310 to provide additional confirmation or confidence. For example, the operation 1312 may be performed subsequent to operation 1310 as shown by the dashed line in FIG. 13.

Figure 15:
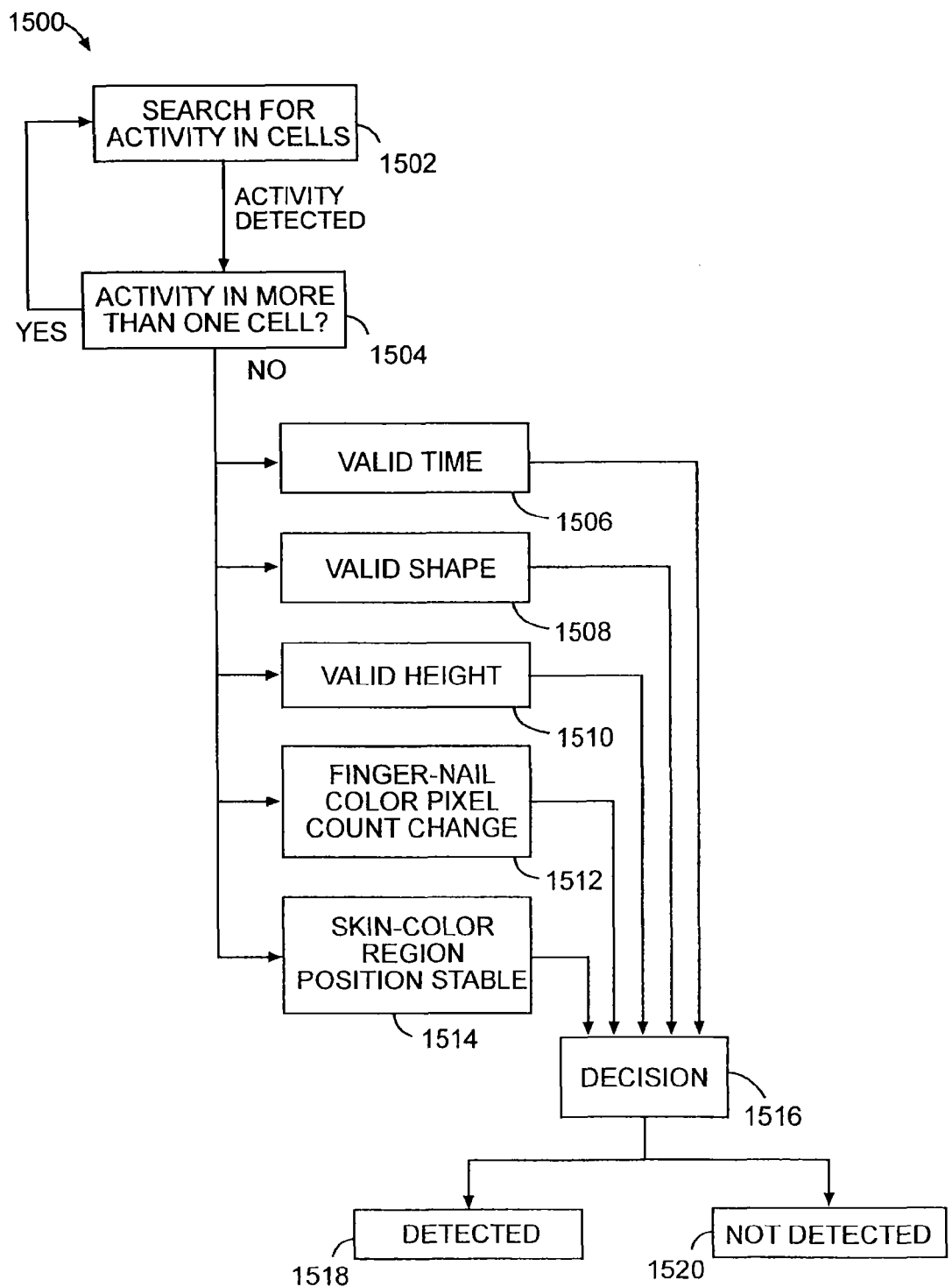
FIG. 15 is a flowchart of a method according to an embodiment.

In one embodiment, two or more validation tests may be performed and the results combined to determine whether a tentative conclusion that a user intends to provide input using a projected control should be confirmed. FIG. 15 shows an exemplary method 1500 for combining validation test results. In operation 1502, one or more cells corresponding with a physical location of a projected control may be repeatedly searched. If activity is detected within the cell, it may be tentatively concluded that the user intends to provide input using a projected control. In optional operation 1504, it is determined if activity is also detected in another cell (in cases where two or more cells are searched). If activity is also detected in another cell, the method returns to operation

1502. The operations 1502 and 1504 may be the same as or similar to any corresponding operation of the operations 602-612.

If activity is detected within one cell, operations 1506, 1508, 1510, 1512, and 1514 may be invoked. Each of the operations 1506-1514 may independently determine whether a tentative conclusion should be confirmed and may return an indication of its determination. The operations 1506, 1508, and 1510 correspond respectfully with the operations 618, 620, and 622 described above. In addition, the operation 1512 corresponds with the operations 1302, 1304, 1306, 1308, and 1310. Further, the operation 1514 corresponds with the operations 1302, 1304, 1306, 1312, and 1314. A decision operation 1516 receives the confirming/non-confirming indications of each of the operations 1506-1514. In one embodiment, each indication is given one vote and a majority of votes determines whether to confirm the tentative conclusion that the user intends to use the projected control. In one embodiment, the operation 1512 may return an "abstaining" indication if the operation is unable to detect a sufficient number of fingernail-colored pixels. In alternative embodiments, the operation 1516 may include a decision based on a weighted polling of validation tests. The method 1300 provides the advantage that a group of tests will always outperform most of the individual tests. A further advantage of the method 1300 is that each of the tests is relatively inexpensive to implement.

The use of projected controls include advantages such as the appearance of the control not being degraded (e.g., wearing down) with repeated physical contact, the appearance of the control being readily modifiable, and the ability to hide the control when it is not needed. While embodiments have been described in terms of detecting a user's intent to provide input to a projected user interface, it is not essential that the image of the control be a projected image. In one embodiment the one or more projected controls described in the various embodiments above may be replaced with a non-projected image on the surface 104, such as a painted image, an engraved image, an image applied as a decal, label, or sticker, or other non-projected image.

The methods and their variations described above may be implemented in hardware, software, or in a combination of hardware and software. Software for implementing all or part of any method described above may stored in any suitable memory for execution by a control unit 502 or processing unit 504.

It should be understood that the embodiments described above may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed may be referred to in terms, such as producing, identifying, determining, or comparing.

Any of the operations described in this specification that form part of the embodiments are useful machine operations. As described above, some embodiments relate to a device or an apparatus specially constructed for performing these operations. It should be appreciated, however, that the embodiments may be employed in a general purpose computer selectively activated or configured by a computer program stored in the computer. In particular, various general purpose computer systems may be used with computer programs written in accordance with the teachings herein. Accordingly, it should be understood that the embodiments may also be embodied as computer readable code on a computer readable medium.

A computer readable medium is any data storage device that can store data which can be thereafter read by a computer system. Examples of the computer readable medium include, among other things, flash drives, floppy disks, memory cards, hard drives, RAMs, ROMs, EPROMs, compact disks, and magnetic tapes. In one embodiment, any method described above may be stored as a program of instructions on a computer readable medium.

Although the present invention has been fully described by way of the embodiments described in this specification with reference to the accompanying drawings, various changes and modifications will be apparent to those having skill in this field. Therefore, unless these changes and modifications depart from the scope of the present invention, they should be construed as being included in this specification.

The invention claimed is:

1. An apparatus for determining whether a user intends to provide an input using an image of a control cell appearing on a surface, comprising:
   a first camera to capture a first set of two or more images of the surface, each captured image including the control cell; and
   a digital processor to determine whether first, second, and third conditions are true, the first condition being that a count of pixels classified as skin color within a captured control cell is not be less than a predefined threshold skin-color-pixel count value, the captured control cell having a location substantially coinciding with the image of the control cell appearing on the surface, assigning a numerically ascending index number to each pixel location along a target row of continuous pixel locations traversing the captured control cell and summing select index numbers to establish the second condition, the second condition being that the pixels classified as skin color persist for at least a particular time period, the third condition being that the pixels classified as skin color have a first shape, and to provide a signal indicative of an intent of a user to provide an input if the each of the first, second, and third conditions are true;
   wherein determination of said third condition includes bifurcating the captured control cell into two regions abutting along a linear divide, the two abutting regions defining a first region including all pixels classified as finger-nail color and a second region excluding all pixels classified as finger-nail color, determining a first width span, i.e. W1, of pixels classified as skin color in the second region along the linear divide that abuts the first region, the captured control cell having a linear edge parallel to the linear divide, the linear edge being a second side of the second region opposite the linear divide, and determining a second width span, i.e. W2, of pixels classified as skin color in the second region along the second side of the second region, and determining that the third condition is true if an absolute value of a difference of W1 and W2 is less than a predefined margin value.

2. The apparatus of claim 1, further comprising:
   a second camera to capture a set of two or more images of the surface, the second camera being spaced apart from the first camera; and
   the digital processor determines whether a fourth condition is true, the fourth condition being that the pixels classified as skin color and having the first shape are within a first distance from the surface, and the unit provides a signal indicative of an intent of a user to provide an input if the each of the first, second, third and fourth conditions are true;

wherein:

the second set of two or more images include a second cell having a location substantially coinciding with the image of the control, determining a first edge of pixels classified as skin color within said first cell, determining a second edge of pixels classified as skin color within said second cell, said second edge of pixels corresponding to said first edge of pixels, and determining that the fourth condition is true if a displacement distance between the corresponding the first edge of pixels and second edge of pixels is not greater than a predefined offset distance.

3. The apparatus of claim 1, wherein the predefined margin value is one-twelfth the span of the linear divide.

4. The apparatus of claim 1, wherein the predefined threshold skin-color-pixel count value is two-thirds the total number of pixels that make up the captured control cell.

5. The apparatus of claim 1, wherein:

the digital processor further determines whether a fourth condition is true, the fourth condition being true if a first count of pixels classified as finger-nail color in a first captured image within said first set of two or more images is greater by a predetermined nail-color threshold than a second count of pixels classified as finger-nail color in a second captured image within said first set of two or more images, the second captured image being captured after the first captured image; and the digital processor further provides the signal indicative of an intent of a user to provide an input if the each of the first, second, third and fourth conditions are true.

6. The apparatus of claim 5, wherein the predetermined nail-color threshold is one-thirtieth of the total number of pixels in the captured control cell.

7. The apparatus of claim 1, wherein the digital processor further:

segments the captured control cell to define a figure-nail segment consisting of pixels classified as finger-nail color;

determines whether a fourth condition is true, the fourth condition being true if a count of white pixels within the finger-nail segment meets a predetermined white-count threshold; and provides the signal indicative of an intent of a user to provide an input if the each of the first, second, third and fourth conditions are true.

8. The apparatus of claim 1, wherein determination of said second condition includes:

for a first captured image within said first set of two or more images, identifying a first row of pixels corresponding to the target row, converting to zero a predefined pixel color value of all pixels within the first row that are non-skin color, and summing up the corresponding assigned index number of each pixel location within the first row of pixels that has a pixel whose predefined pixel color value is not less than a predefined color threshold greater than zero to obtain a first row-sum value;

for a second captured image within said first set of two or more images, identifying a second row of pixels corresponding to the target row, converting to zero the predefined pixel color value of all pixels within the second row that are non-skin color, and summing up the corresponding assigned index number of each pixel location within the second row of pixels that has a pixel whose predefined pixel color value is not less than the predefined color threshold to obtain a second row-sum value; and determining that the second condition is true if the second row-sum value matches the first row-sum value.

9. The apparatus of claim 8, wherein determination of said second condition further includes:

assigning a numerically ascending index number to each pixel location along a target column of continuous pixel locations traversing the captured control cell;

for the first captured image within said first set of two or more images, identifying a first column of pixels corresponding to the target column, converting to zero the predefined pixel color value of all pixels within the first column that are non-skin color, and summing up the corresponding assigned index number of each pixel location within the first column of pixels that has a pixel whose predefined pixel color value is not less than the predefined color threshold to obtain a first column-sum value;

for the second captured image within said first set of two or more images, identifying a second column of pixels corresponding to the target column, converting to zero the predefined pixel color value of all pixels within the second column that are non-skin color, and summing up the corresponding assigned index number of each pixel location within the second column of pixels that has a pixel whose predefined pixel color value is not less than the predefined color threshold to obtain a second column-sum value; and further determining that the second condition is true if the second column-sum value matches the first column-sum value.

10. The apparatus of claim 1, wherein the captured control cell has a substantially rectangular shape.

11. The apparatus of claim 1, further comprising a projector, wherein:

the surface on which the control appears is a projection surface;

the projector projects the image of the control cell on the projection surface; and the first camera is positioned facing the projection surface.

12. The apparatus of claim 1, wherein when bifurcating the captured control cell into two abutting regions along the linear divide, the captured control cell is bisected by the linear divide.

13. The apparatus of claim 1, wherein within each captured image, the area of the captured control cell within the captured image is a fraction of the total area the captured image.

* * * * *